(12) United States Patent
Koripella et al.

(10) Patent No.: US 6,465,119 B1
(45) Date of Patent: Oct. 15, 2002

(54) FUEL CELL ARRAY APPARATUS AND METHOD OF FABRICATION

(75) Inventors: Chowdary Ramesh Koripella, Scottsdale; Joseph W. Bostaph, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 129 days.

(21) Appl. No.: 09/619,232

(22) Filed: Jul. 18, 2000

(51) Int. Cl.$^7$ ................................................. H01M 8/10
(52) U.S. Cl. .............................. 429/32; 429/12; 429/13; 429/34; 429/44
(58) Field of Search .............................. 429/12, 13, 32, 429/34, 44

(56) References Cited

U.S. PATENT DOCUMENTS 6,040,075 A * 3/2000 Adcock et al. ............. 429/162

* cited by examiner

*Primary Examiner*—Carol Chaney
*Assistant Examiner*—Dah-Wei D. Yuan
(74) *Attorney, Agent, or Firm*—William E. Koch

(57) ABSTRACT

A fuel cell array apparatus and method of forming the fuel cell array apparatus including a base portion, formed of a singular body, and having a major surface. At least two spaced apart membrane electrode assemblies formed on the major surface of the base portion. A fluid supply channel is defined in the base portion and equally communicating with each of the at least two spaced apart membrane electrode assemblies for supplying a fuel-bearing fluid to each of membrane electrode assemblies. An exhaust channel is defined in the base portion and equally communicating with each of the membrane electrode assemblies. Each of membrane electrode assemblies and the cooperating fluid supply channel and cooperating exhaust channel forms a single fuel cell assembly. There is additionally included a top portion characterized as providing for the exposure of a portion of each fuel cell assembly to ambient air and a plurality of electrical components for electrical integration of the plurality of formed fuel cell assemblies.

27 Claims, 2 Drawing Sheets

FUEL CELL ARRAY APPARATUS AND METHOD OF FABRICATION

FIELD OF INVENTION

The present invention pertains to fuel cells, and more particularly to an array of direct methanol fuel cells and a method of fabricating the array of fuel cells, in which electrical energy is produced through the consumption of gaseous or liquid fuels.

BACKGROUND OF THE INVENTION

Fuel cells in general, are "battery replacements", and like batteries, produce electricity through an electrochemical process without combustion. The electrochemical process utilized provides for the combining of hydrogen with oxygen from the air. The process is accomplished utilizing a proton exchange membrane (PEM) sandwiched between two electrodes, namely an anode and a cathode. Fuel cells, as known, can provide perpetual electricity as long as fuel and oxygen is supplied. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode) and the cathode side (second electrode) is exposed to forced or ambient air (or O2). A nafion type proton conducting membrane typically separates the anode and the cathode sides. The flow streams must be kept separate in the design of the fuel cell. Several of these fuel cells can be connected in series or parallel depending on the power requirements.

Typically DMFCs designs are large stacks with forced airflow at elevated temperatures. Smaller air breathing DMFC designs are more complicated. In conventional PEM fuel cells, stack connections are made between the fuel cell assemblies with conductive plates, machined with channels or grooves for gas distribution. A typical conventional fuel cell is comprised of an anode ($H_2$ or methanol side) current collector, anode backing, membrane electrode assembly (MEA) (anode/ion conducting membrane/cathode), cathode backing, and cathode current collector. Each fuel cell generates approximately 1.0 V, although the typical operating voltage is lower. To obtain higher voltages, fuel cells are typically stacked in series (bi-polar manner—positive to negative) one on top another. Conventional fuel cells can also be stacked in parallel (positive to positive) to obtain higher current, but typically, larger fuel cells are simply used. When stacking fuel cells, the fuel and oxidant must remain separated. This requires creative management of the gas flows.

DMFCs typically operate between 0.2–0.8 volts. To power a device requiring greater potentials, multiple fuel cells need to be connected in series for bipolar voltage adding. However, a device capable of higher voltages is sought in which a small single planar surface, thus a smaller area, is utilized. In this instance, multiple DMFCs are formed on a single planar surface. Each fuel cell will include a fuel inlet and a fuel outlet. There is a need to form the array of fuel cells to share components, such as microfluidic channels that feed the multiple fuel cells simultaneously.

Accordingly, it is a purpose of the present invention to provide for a planar array design in which multiple direct methanol fuel cells can be "stacked" in a planar array, so that higher voltages can be obtained.

It is a purpose of the present invention to provide for a planar stack design for a plurality of direct methanol fuel cells in which a planar array of direct methanol fuel cells is achieved on a single planar surface.

It is a further purpose of the present invention to provide for a planar stack design for direct methanol fuel cells in which a plurality of microfluidic channels are utilized to equivalently and simultaneously feed the plurality of direct methanol fuel cells, remove the exhaust, namely carbon dioxide, and recirculate the methanol/water mixture.

It is yet a further purpose of the present invention to provide for method of fabricating a planar stack of direct methanol fuel cells in which a planar array of direct methanol fuel cells is achieved on a single planar surface including a plurality of microfluidic channels to feed a fuel-bearing fluid, remove carbon dioxide exhaust, and recirculate the methanol/water mixture.

SUMMARY OF THE INVENTION

The above problems and others are at least partially solved and the above purposes and others are realized in a fuel cell array apparatus and method of forming the fuel cell array apparatus including a base portion, formed of a singular body, and having a major surface. At least two spaced apart membrane electrode assemblies are formed on the major surface of the base portion. A fluid supply channel is defined in the base portion and communicating with each of the at least two spaced apart membrane electrode assemblies for supplying a fuel-bearing fluid to each of the at least two spaced apart membrane electrode assemblies. An exhaust channel is defined in the base portion and communicating with each of the at least two spaced apart membrane electrode assemblies. The exhaust channel is spaced apart from the fluid supply channel for exhausting fluid from each of the at least two spaced apart membrane electrode assemblies. Each of the two spaced apart membrane electrode assemblies and the cooperating fluid supply channel and cooperating exhaust channel forms a single fuel cell assembly. There is additionally included a top portion which includes a plurality of electrical components for electrical integration of the plurality of formed fuel cell assemblies.

BRIEF DESCRIPTION OF THE DRAWINGS

Referring to the drawings.

DESCRIPTION OF THE PREFERRED EMBODIMENTS

Figure 1:
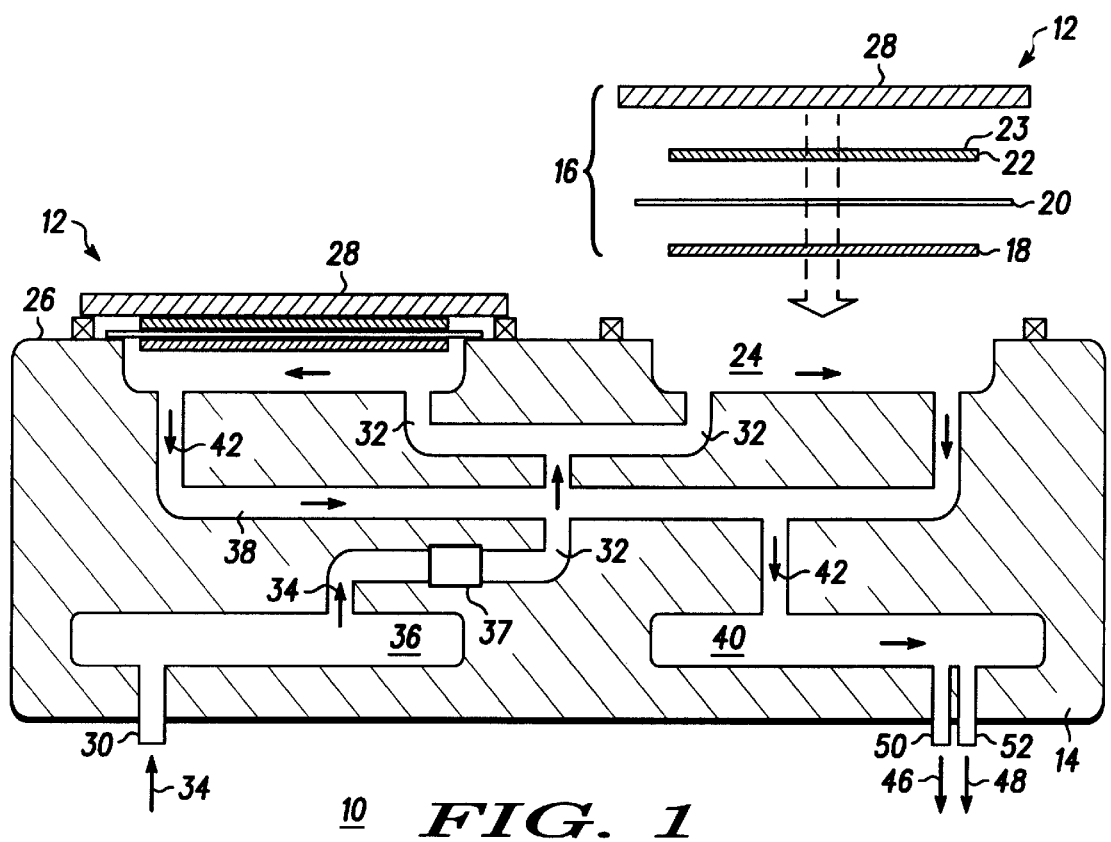
FIG. 1 is a simplified sectional view of a plurality of thin film fuel cell devices formed on a single base portion including a plurality of microfluidic channels, according to the present invention.

Turning now to the drawings, FIG. 1 illustrates in simplified sectional view a planar stack array of direct methanol fuel cells fabricated according to the present invention. More particularly, there is formed a planar stack array 10, including at least two direct methanol fuel cells, generally referenced 12. Fuel cells 12 are formed on a base portion 14, each fuel cell 12 being spaced at least 1 mm apart from an adjacent fuel cell 12. It should be understood that dependent upon the required power output, any number of fuel cells 12 can be fabricated to form a planar array of fuel cells. Base portion 14 is formed from materials designed to be impermeable to the mixture of fuel and oxidizer materials that is utilized to power fuel cells 12. Typically a hydrogen-containing fuel/oxidizer mixture is utilized to power fuel cells 12. Suitable fuels that are consumed by fuel cells 12 to produce electrical energy are hydrogen-containing materials such as hydrogen, methane and methanol. In this particular example, methanol is used to fuel cells 12. Base portion 14 is typically formed of glass, plastic, silicon, ceramic, or any other suitable material. Planar stack array 10 is composed of the at least two direct methanol fuel cells 12 each defined by a fuel cell membrane electrode assembly (MEA) 16, accordingly, planar stack array 10 includes at least two fuel cell membrane electrode assemblies. Fuel cell membrane electrode assembly 16 is comprised of a first electrode 18, including a carbon cloth backing, a film 20, such as a porous proton conducting electrolyte membrane, and a second electrode 22, including a carbon cloth backing. First and second electrodes 18 and 22 are comprised of a material selected from the group consisting of platinum, palladium, molybdenum, gold, nickel, tungsten, carbide, ruthenium, and alloys of platinum, palladium, molybdenum, gold, nickel, tungsten carbide, and ruthenium. Film 20 is further described as formed of a Nafion type material which is proton conductive, but limits the permeation of the fuel from the anode side to the cathode side. It should be understood that film 20 can be formed as a single film membrane in which a plurality of fuel cell assemblies are formed to include the single film membrane, or a film in which each individual fuel cell assembly defines the limits of the film.

Membrane electrode assembly 16 in this particular example is positioned in a recess 24 formed in an uppermost major surface 26 of base portion 12. It is anticipated by this disclosure that membrane electrode assembly 16 can be positioned on major surface 26 of base portion 12 without the need for the formation of recess 24. In this instance, a spacer, such as a gasket, (not shown) would be utilized to avoid complete compression of membrane electrode assembly 16.

Planar stack array 10 further includes a top portion, more specifically, in this particular embodiment, a current collector 28 positioned to overlay membrane electrode assembly 16. Current collector 28 is disclosed in a preferred embodiment as being formed discretely over each individually formed fuel cell membrane electrode assembly 16. Current collector 28 is further described in a preferred embodiment as comprised of a perforated corrugated gold coated stainless steel. It should be understood that in addition it is anticipated that current collector 28 can be formed of any electrically conductive material.

Base portion 14 has formed within a plurality of microfluidic channels as illustrated. More particularly, base portion 14 has formed a fuel inlet, in fluidic communication with a fluid supply channel 32. It should be understood that while only one single fuel inlet 32 is described, that it is anticipated by this disclosure that any number of fuel inlets, more particularly, water and methanol, inlets may be included dependent upon design requirement. Fluid supply channel 32 is formed in base portion 14 utilizing standard techniques, well known in the art, such as multi-layer ceramic technology, micro-machining or injection molding.

Fluid supply channel 32 supplies a fuel-bearing fluid 34 to each of the at least two spaced apart fuel cell membrane electrode assemblies 16. In this particular example, fuel-bearing fluid 34 is comprised of methanol and water. A mixing chamber 36 is formed in base portion 14 in microfluidic communication with fluid supply channel 32 as illustrated. In a preferred embodiment, fuel-bearing fluid 34 is 0.5%–4.0% methanol in water (96%–99.5%). The goal is to pump methanol into the overall assembly 10 at a rate of 0.002 ml/min and pump the water into the assembly 10 at a rate of 0.098 ml/min (2% to 98%). The fuel cell assembly 10 would also be able to use other fuels, such as hydrogen or ethanol. Although, it should be understood that ethanol is not as efficient, nor does it produce as much power as the use of methanol. In this particular example separate methanol and water tanks are utilized to supply the fuel-bearing fluid. The methanol will be pumped in at a given rate, and the water will be added as needed determined by the methanol concentration sensor 37. They will be homogeneously mixed in mixing chamber 36 before heading to each individual fuel cells 12. In the alternative, as previously disclosed, fuel-bearing fluid 34 can be premixed to the proper proportions which would eliminate the need for mixing chamber 36 and methanol concentration sensor 37. It should be understood that fluid supply channel 32 provides for an equal and simultaneous delivery of fuel-bearing fluid 34 to each individually formed fuel cell 12.

In addition, there is formed in base portion 14, an exhaust channel 38 communicating with each of the at least two spaced apart fuel cells 12. Exhaust channel 38 serves to remove exhaust products 42 from fuel cells 12, namely carbon dioxide, water, and methanol. During operation, exhaust products are separated in a carbon dioxide separation chamber 40 into a water and methanol mixture 46 and a carbon dioxide gas 48. Next, water 46 is expelled through a fluid outlet 50 and gas 48 is expelled through an exhaust outlet 52, such as a gas permeable membrane.

Figure 2:
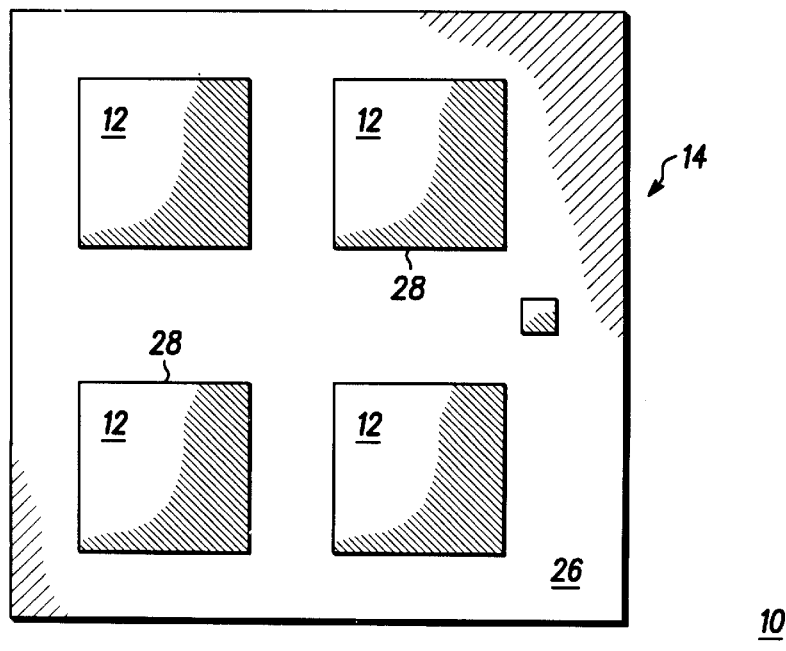
FIG. 2 is a simplified plan view of the fuel cell array apparatus of FIG. 1, illustrating the plurality of discrete fuel cells formed on the base portion.

Referring now to FIG. 2, illustrated in simplified plan view is a typical fuel cell array 10 according to the present invention. As illustrated, in this particular embodiment fuel cell array 10 comprises four individual fuel cells 12, formed on a major surface 26 of base portion 14. As illustrated, fuel cell array 10 has an overall base portion dimension of approximately 5.5 cm×5.5 cm×0.5 cm, and individual fuel cell areas of 4×1.5–2.0 cm squares. Each individual fuel cell 12 is capable of generating approximately 0.47V and 22.5 mA/cm$^2$ of power.

During fabrication, individual fuel cell membrane electrode assemblies 16 are formed using a direct painting method or hot press method. More particularly, the plurality of first electrodes 18 are formed in contact with surface 26 of base portion 14. Various materials are suitable for the formation of electrodes 18. Suitable materials include platinum, palladium, gold, nickel, tungsten carbide, ruthenium, molybdenum, and various alloys of these materials.

In this specific embodiment, and for exemplary purposes, each of the plurality of first electrodes 18 has a dimension of approximately 2.0 cm×2.0 cm. There is included a separation of approximately 0.5 mm to 1 mm between adjacent fuel cells 12.

Film 20, formed of a proton conducting electrolyte, also referred to as proton exchange membrane (PEM), is comprised of a Nafion type material. Film 20 limits the permeation of fuel from the anode side of the fuel cell 20 to the cathode side.

Next, during fabrication of membrane electrode assembly 16, a plurality of second electrodes 22 are formed, correspondingly cooperating with the plurality of first electrodes 18. Each second electrode 22 is formed having approximately the same dimension as its corresponding first electrode 18. It should be understood, that as described, fuel cell membrane electrode assemblies 16 are each comprised of first electrode 18, film 20 and second electrode 22.

Finally, current collector 28 is positioned relative to second electrode 22. Current collector 28 is formed at least 0.1 mm thick and of a length dependent upon a point of contact on each fuel cell 12. In the alternative, the plurality of fuel cells 12 can be electrically interfaced using silver conducting paint deposited by evaporation or sputtering. Materials suitable for this are gold (Au), silver (Au), copper (Cu), or any other low electrical resistant material. The bulk resistivity of the electrode material and area of the electrode will dictate the type of current collection scheme to minimize ohmic losses. In addition, anticipated by this disclosure to achieve electrical interface between the plurality of direct methanol fuel cells 12, are patterned conductive epoxy and pressing, wire bonding, tab bonding, spring contacts, flex tape, or alligator clips. It should be understood, that it is anticipated that fuel cells 12 can be electrically interfaced utilizing either a series connection or a parallel connection, dependent upon the desired resultant voltage. To achieve electrical interfacing of the plurality of fuel cells 10, each of the second electrodes 22 is electrically connected to an adjacent first electrode 18, thus connected in series electrical interface, to increase the output voltage of the fuel cell array apparatus 10; or each of the first electrodes 18 is electrically connected to an adjacent first electrode 18, and each of the second electrodes 22 is electrically connected to an adjacent second electrode 22, thus connected in parallel electrical interface, to increase the output current of the fuel cell array apparatus 10.

Figure 3:
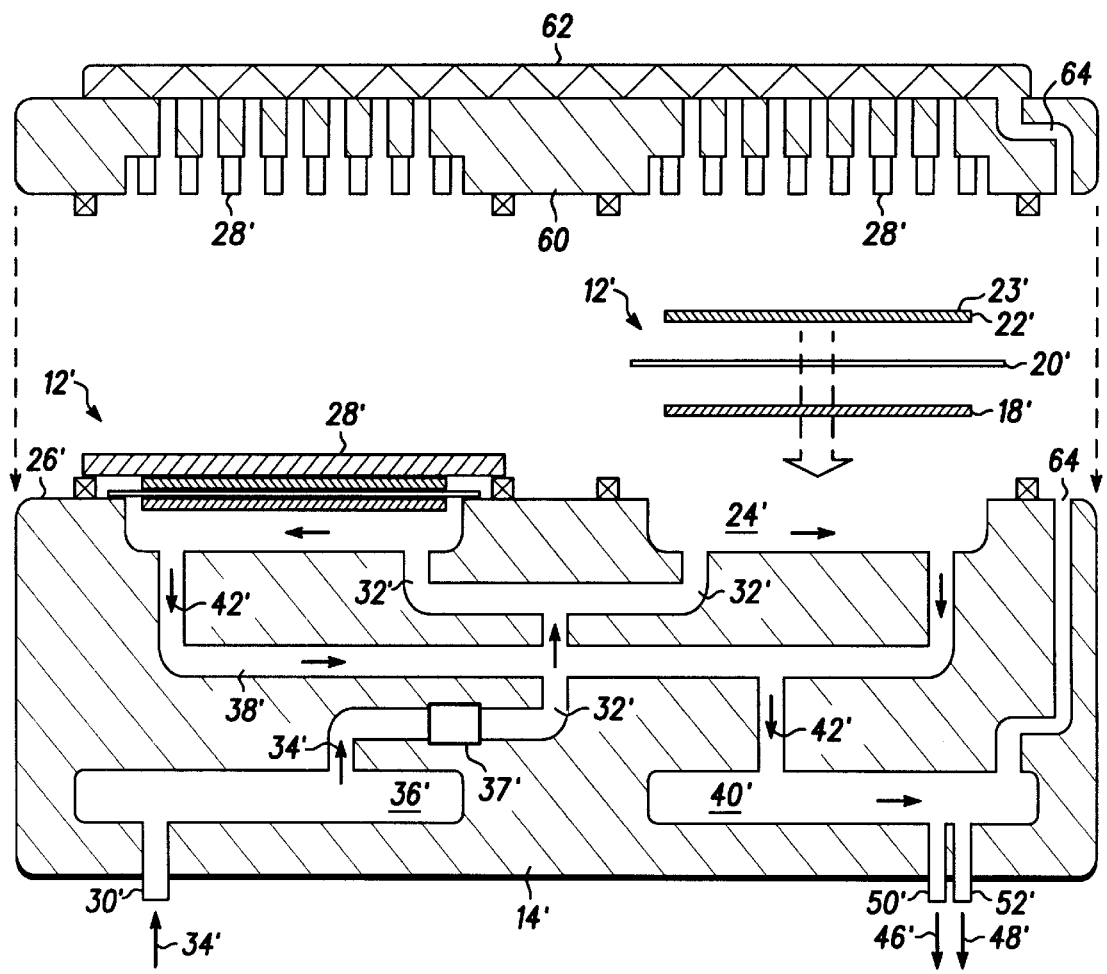
FIG. 3 is a simplified sectional view of an alternative embodiment of a fuel cell planar array including a plurality of direct methanol fuel cell devices formed on a single base portion including a plurality of microfluidic channels, and a top portion, according to the present invention.

Referring now to FIG. 3, illustrated in simplified sectional view is an alternative embodiment of the planar array of fuel cells, generally referenced 10'. It should be noted that all components of the first embodiment as illustrated in FIGS. 1 and 2, that are similar to components of the second embodiment as illustrated in FIG. 3, are designated with similar numbers, having a prime added to indicate the different embodiment. Similar to the structure described with regard to FIGS. 1 and 2, this structure includes at least two direct methanol fuel cells, generally referenced 12'. Fuel cells 12' are formed on a base portion 14', each fuel cell 12' being spaced at least 1 mm apart from an adjacent fuel cell 12'. Planar stack array 10', similar to planar stack array 10 of FIGS. 1 and 2, is composed of the at least two direct methanol fuel cells 12' each defined by a fuel cell membrane electrode assembly (MEA) 16'. Fuel cell membrane electrode assembly 16' is comprised of a first electrode 18', including a carbon cloth backing, a film 20', comprised of a porous protonically conducting electrolyte membrane, and a second electrode 22', including a carbon cloth backing.

Planar stack array 10' further includes a current collector 28' positioned to overlay membrane electrode assembly 16'. In this particular embodiment, current collector 28' is formed as part of a cap portion, generally referenced 60. Cap portion 60, includes a gas permeable water recovery system 62, and a water recovery return channel 64. In addition, it should be understood that cap portion 60 provides for the exposure of second electrode 22' to ambient air. Water recovery system 62 serves to recapture water from the cathode sides of fuel cells 12', and direct it toward water recovery return channel 64 formed in cap portion 60 and continuing through base portion 14', as illustrated. Water recovery return channel 64 is in micro-fluidic communication with a separation chamber 40'' and ultimately a fuel outlet 50', discussed presently.

As illustrated, base portion 14' has formed within, a plurality of micro-fluidic channels. More particularly, base portion 14' has formed a fuel inlet 30', in fluidic communication with a fluid supply channel 32'. Similar to fluid supply channel 32 of FIGS. 1 and 2, fluid supply channel 32' supplies a fuel-bearing fluid 34' to each of at the at least two spaced apart fuel cell membrane electrode assemblies 16'. A mixing chamber 36' is formed in base portion 14' in micro-fluidic communication with fluid supply channel 32' as illustrated. Similar to FIG. 1, in this particular example, separate methanol and water tanks are utilized to supply fuel-bearing fluid 34'. The methanol will be pumped in at a given rate, and the water will be added as needed determined by a methanol sensor 37'. They will be homogeneously mixed in mixing chamber 36' before flowing to each individual fuel cells 12'. In the alternative, as previously disclosed, fuel-bearing fluid 34' can be pre-mixed which would eliminate the need for mixing chamber 36' and methanol sensor 37'. It should be understood that fluid supply channel 32' provides for an equal and simultaneous delivery of fuel-bearing fluid 34' to each individually formed fuel cell 12'.

In addition, there is formed in base portion 14', an exhaust channel 38' communicating with each of the at least two spaced apart fuel cells 12'. Exhaust channel 38' serves to remove exhaust products 42' from fuel cells 12', namely carbon dioxide and water/methanol. During operation, exhaust products are separated in carbon dioxide separation chamber 40' into a water and methanol mixture 46' and a carbon dioxide gas 48'. Next, the water and methanol mixture 46' is expelled through fluid outlet 50' and gas 48' is expelled through an exhaust outlet 52', such as a gas permeable membrane.

Accordingly, disclosed is a fuel cell array apparatus and method of fabrication which provides for the fabrication of multiple fuel cells to be deposited on a planar surface, thus allowing higher voltages and currents to be gained on a single planar surface. More particularly, the design provides for high voltages on a planar surface, in a very small area, and allows for the feeding of a fuel-bearing fluid and the exhausting of by-products, equivalently and simultaneously to the plurality of fuel cells through a series of micro-fluidic channels formed in a base portion.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell array apparatus comprising:
   a base portion, formed of a singular body, and having a major surface;
   at least two spaced apart fuel cell membrane electrode assemblies formed on the major surface of the base portion;
   a fluid supply channel, including a mixing chamber, defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and further including a plurality of electrical components for electrical integration of the plurality of formed fuel cell assemblies.

2. A fuel cell array apparatus as claimed in claim 1 wherein the base portion comprises a material selected from the group consisting of ceramic, plastic, glass, and silicon.

3. A fuel cell array apparatus as claimed in claim 1 wherein each of the at least two spaced apart fuel cell membrane electrode assemblies includes a first electrode, a film formed adjacent the first electrode, formed of a perfluorosulphonate cation exchange membrane (NAFION) material, and a second electrode formed adjacent the film.

4. A fuel cell array apparatus as claimed in claim 3 wherein the first and second electrodes comprise a material selected from the group consisting of platinum, palladium, gold, nickel, tungsten carbide, ruthenium, molybdenum, and alloys of platinum, palladium, gold, nickel, tungsten carbide, molybdenum, and ruthenium.

5. A fuel cell array apparatus as claimed in claim 4 wherein the film overlying the first electrode comprises a material characterized as a proton exchange material.

6. A fuel cell array apparatus as claimed in claim 5 wherein the at least two spaced apart fuel cell membrane electrode assemblies share the film formed adjacent the first electrode of a perfluorosulphonate cation exchange membrane (NAFION) material.

7. A fuel cell array apparatus as claimed in claim 3 wherein each of the second electrodes is electrically connected to an adjacent first electrode, thus connected in series electrically, to increase the output voltage of the fuel cell array apparatus.

8. A fuel cell array apparatus as claimed in claim 3 wherein each of the first electrodes is electrically connected to an adjacent first electrode, and each of the second electrodes is electrically connected to an adjacent second electrode, thus connected in parallel electrically, to increase the output current of the fuel cell array apparatus.

9. A fuel cell array apparatus as claimed in claim 1 wherein the fluid supply channel defined in the base portion and equally communicating with each of the at least two spaced apart fuel cell membrane electrode assemblies includes a methanol concentration sensor.

10. A fuel cell array apparatus as claimed in claim 1 wherein the exhaust channel defined in the base portion and equally communicating with each of the at least two spaced apart fuel cell membrane electrode assemblies further includes a carbon dioxide separation chamber and a carbon dioxide exhaust vent.

11. A fuel cell array apparatus as claimed in claim 1 wherein the fuel cell membrane electrode assemblies are spaced at least 1 mm from an adjacent fuel cell membrane electrode assembly.

12. A fuel cell array apparatus comprising:

a base portion, formed of a singular body, and having a major surface, the base portion formed of a material selected from the group consisting of ceramic, plastic, glass, and silicon;

at least two spaced apart fuel cell membrane electrode assemblies formed on the major surface of the base portion, each of the at least two spaced apart fuel cell membrane electrode assemblies including a first electrode, a film in contact with the first electrode and formed of a protonically conductive electrolyte, and a second electrode in contact with the film;

a fluid supply channel, including a mixing chamber, defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and including a plurality of electrical components for electrical integration of the plurality of formed fuel coil assemblies.

13. A fuel cell array apparatus as claimed in claim 12 wherein the first and second electrodes comprise a material selected from the group consisting of platinum, palladium, gold, nickel, tungsten, carbide, ruthenium, and alloys of platinum, palladium, gold, nickel, tungsten carbide, molybdenum, and ruthenium.

14. A fuel cell array apparatus as claimed in claim 12 wherein the plurality of first and second electrodes are electrically connected in one of a series electrical interface or a parallel electrical interface.

15. A fuel cell array apparatus as claimed in claim 12 wherein the fluid supply channel defined in the base portion and equally communicating with each of the at least two spaced apart fuel cell membrane electrode assemblies includes a methanol concentration sensor.

16. A fuel cell array apparatus as claimed in claim 12 wherein the exhaust channel defined in the base portion and equally communicating with each of the at least two spaced apart fuel cell membrane electrode assemblies includes a carbon dioxide separation chamber and a carbon dioxide exhaust vent.

17. A fuel cell array apparatus as claimed in claim 12 wherein the top portion of the fuel cell array apparatus further includes a water recovery system formed adjacent thereto.

18. A method of fabricating a fuel cell array apparatus comprising the steps of:

providing a base portion formed of a material selected from the group consisting of ceramic, plastic, glass, and silicon;

forming a fluid supply channel, including a mixing chamber, in the base portion for equally supplying a fuel-bearing fluid to each of at least two spaced apart fuel cell membrane electrode assemblies;

forming an exhaust channel in the base portion, the exhaust channel spaced apart from the fluid supply channel for exhausting fluid from each of the at least two spaced apart fuel cell membrane electrode assemblies;

forming the at least two spaced apart fuel cell membrane electrode assemblies on the major surface of the base portion, the step of forming each of the at least two spaced apart fuel cell membrane electrode assemblies including the steps of bringing into contact a first electrode and a major surface of the base portion, bringing into contact a film and the first electrode, and bringing into contact a second electrode and the film, each of the two spaced apart fuel cell membrane electrode assemblies and the cooperating fluid supply channel and cooperating exhaust channel forming a single fuel cell assembly; and forming a top portion characterized as providing for the exposure of a portion of each fuel cell assembly to ambient air and including a plurality of electrical components for electrical integration of the plurality of formed fuel cell assemblies.

19. A method of fabricating a fuel cell array apparatus as claimed in claim 18 wherein the step of forming an exhaust channel in the base portion further includes the step of forming a carbon dioxide separation chamber in the exhaust channel.

20. A method of fabricating a fuel cell array apparatus as claimed in claim 18 wherein the step of electrically interfacing the plurality of fuel cells includes one of the steps of electrically connecting each of the second electrodes to an adjacent first electrode, thus connecting the plurality of fuel cells in series electrically to increase the output voltage of the structure or electrically connecting each of the first electrodes to an adjacent first electrode and connecting each of the second electrodes to an adjacent second electrode, thus connected in parallel electrically to increase the output current.

21. A fuel cell array apparatus comprising:

a base portion, formed of a singular body, and having a major surface;

at least two spaced apart fuel cell membrane electrode assemblies formed on the major surface of the base portion;

a fluid supply channel, including a methanol concentration sensor, defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and further including a plurality of electrical components for electrical integration of the plurality of formed fuel cell assemblies.

22. A fuel cell array apparatus as claimed in claim 21 wherein the base portion comprises a material selected from the group consisting of ceramic, plastic, glass, and silicon.

23. A fuel cell array apparatus comprising:

a base portion, formed of a singular body, and having a major surface;

at least two spaced apart fuel cell membrane electrode assemblies formed on the major surface of the base portion;

a fluid supply channel defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel, including a carbon dioxide separation chamber and a carbon dioxide exhaust vent, defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and further including a plurality of electrical components for electrical integration of the plurality of formed fuel cell assemblies.

24. A fuel cell array apparatus as claimed in claim 23 wherein the base portion comprises a material selected from the group consisting of ceramic, plastic, glass, and silicon.

25. A fuel cell array apparatus comprising:

a base portion, formed of a singular body, and having a major surface, the base portion formed of a material selected from the group consisting of ceramic, plastic, glass, and silicon;

at least two spaced apart fuel cell membrane electrode assemblies formed on the major surface of the base portion, each of the at least two spaced apart fuel cell membrane electrode assemblies including a first electrode, a film in contact with the first electrode and formed of a protonically conductive electrolyte, and a second electrode in contact with the film;

a fluid supply channel, including a methanol concentration sensor, defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and including a plurality of electrical components for electrical integration of the plurality of formed fuel cell assemblies.

26. A fuel cell array apparatus comprising:

a base portion, formed of a singular body, and having a major surface, the base portion formed of a material selected from the group consisting of ceramic, plastic, glass, and silicon;

at least two spaced apart fuel cell membrane electrode assemblies formed on the major surface of the base portion, each of the at least two spaced apart fuel cell membrane electrode assemblies including a first electrode, a film in contact with the first electrode and formed of a protonically conductive electrolyte, and a second electrode in contact with the film;

a fluid supply channel defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel, including a carbon dioxide exhaust vent, defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion characterized as providing for the exposure of a portion of each fuel cell assembly to ambient air and including a plurality of electrical components for electrical integration of the plurality of formed fuel cell assemblies.

27. A fuel cell array apparatus comprising:

a base portion, formed of a singular body, and having a major surface, the base portion formed of a material selected from the group consisting of ceramic, plastic, glass, and silicon;

at least two spaced apart fuel cell membrane electrode assemblies formed on the major surface of the base portion, each of the at least two spaced apart fuel cell membrane electrode assemblies including a first electrode, a film in contact with the first electrode and formed of a protonically conductive electrolyte, and a second electrode in contact with the film;

a fluid supply channel defined in the base portion and equally communicating with each of the at least two spaced apart fuel cell membrane electrode assemblies for equally supplying a fuel-bearing fluid to each of the at least two spaced apart fuel cell membrane electrode assemblies;

an exhaust channel defined in the base portion and equally communicating with each of the at least two spaced apart fuel cell membrane electrode assemblies, the exhaust channel spaced apart from the fluid supply channel for exhausting fluid from each of the at least two spaced apart fuel cell membrane electrode assemblies, each of the two spaced apart fuel cell membrane electrode assemblies and the cooperating fluid supply channel and cooperating exhaust channel forming a single fuel cell assembly; and a top portion, including a water recovery system formed adjacent thereto, characterized as providing for the exposure of a portion of each fuel cell assembly to ambient air and including a plurality of electrical components for electrical integration of the plurality of formed fuel cell assemblies.

\* \* \* \* \*